United States Patent [19]

Deter et al.

[11] Patent Number: 5,694,180
[45] Date of Patent: Dec. 2, 1997

[54] PROJECTION SYSTEM FOR PROJECTING A COLOR VIDEO PICTURE AND TRANSFORMATION OPTICAL SYSTEM FOR SAME

[75] Inventors: Christhard Deter; Klaus Hiller, both of Gera; Günther Elster, Günzburg; Rolf Rüder, Jena-Lobeda; Wolfgang Holota, Jena-Winzerla, all of Germany

[73] Assignee: LDT GmbH & Co. Laser-Display-Technologie KG, Gera, Germany

[21] Appl. No.: 645,923

[22] Filed: May 14, 1996

Related U.S. Application Data

[63] Continuation of Ser. No. 270,258, Jul. 5, 1994, abandoned.

[30] Foreign Application Priority Data

Jul. 23, 1993 [DE] Germany .................. 43 24 849.7

[51] Int. Cl.$^6$ .................. H04N 3/23; H04N 5/74; G02F 1/00; G02B 27/10
[52] U.S. Cl. .................. 348/746; 348/747; 348/757; 348/803; 359/618; 359/652
[58] Field of Search .................. 348/744–747, 348/752, 753, 756, 757, 760, 762, 763, 767, 768, 789, 800–803; 359/618, 634, 652, 654, 793–795; H04N 5/74

[56] References Cited

U.S. PATENT DOCUMENTS

| 3,708,616 | 1/1973 | Von Fogel | 348/196 |
|---|---|---|---|
| 3,864,730 | 2/1975 | Roth | 348/750 |
| 4,003,080 | 1/1977 | Maiman | 348/754 |
| 4,297,723 | 10/1981 | Whitby | 348/760 |
| 4,979,030 | 12/1990 | Murata | 348/750 |
| 5,136,426 | 8/1992 | Linden et al. | 348/754 |
| 5,138,441 | 8/1992 | Tanaka | 348/745 |

FOREIGN PATENT DOCUMENTS

| 0 360 233 | 3/1990 | European Pat. Off. | G02B 13/00 |
|---|---|---|---|
| 0 506 338 A1 | 9/1992 | European Pat. Off. | G02B 13/00 |
| 33 15 475 A1 | 11/1983 | Germany | H04N 5/74 |
| 39 23 183 C2 | 1/1991 | Germany | G02B 13/00 |
| 42 27 595 A1 | 2/1993 | Germany | G02B 26/10 |
| 3-88586 | 8/1989 | Japan | H04N 5/74 |
| 3-88586 | 4/1991 | Japan . | |

OTHER PUBLICATIONS

Patent Abstracts of Japan, vol. 16, No. 189 (P–1348), May 8, 1992 (Japanese Publication No. JP 4024685, published Jan. 28, 1992).
Article entitled "High Quality Laser Color Television Display, by Teiichi Taneda et al, Journal of the SMPTE", vol. 82, Jun. 1973, pp. 470–474.

*Primary Examiner*—John K. Peng
*Assistant Examiner*—John W. Miller
*Attorney, Agent, or Firm*—McAulay Fisher Nissen Goldberg & Kiel, LLP

[57] ABSTRACT

In a projection system for projecting a video picture composed of picture points on a screen with at least one light source which emits a light bundle and can be varied in intensity and with a deflecting device which deflects the light bundle to illuminate the picture points on the screen, a transformation optical system having at least two stages is arranged between the deflecting device and the screen and is corrected according to the tangent condition so as to be free of distortion. The transformation optical system has at least two optical stages. The first optical stage produces an intermediate image plane which is imaged on the screen by means of the subsequent optical stage (s).

21 Claims, 5 Drawing Sheets

PROJECTION SYSTEM FOR PROJECTING A COLOR VIDEO PICTURE AND TRANSFORMATION OPTICAL SYSTEM FOR SAME

This is a continuation of application Ser. No. 08/270,258, filed Jul. 5, 1994, now abandoned.

BACKGROUND OF THE INVENTION a) Field of the Invention

The invention is directed to a projection system for projecting a video picture composed of picture points on a screen with at least one light source which emits a light bundle and can be varied in intensity and with a deflecting device which deflects the light bundle to illuminate the picture points on the screen. Further, the invention is also directed to a transformation optical system which is suitable particularly for use in such a projection system.

b) Background Art

Processes and apparatus in which a video picture is directly generated in a corresponding size are known from the prior art. In addition to standard television picture tubes, there are also liquid crystal displays, plasma displays, and ferromagnetic displays. Such techniques have the disadvantage that the size of the picture is limited in a technical respect. For example, the standard television picture tube can produce maximum pictures with a screen diagonal of approximately 1 m. In the current state of the art, the mass of the picture tube is roughly 60 kg and its depth is approximately 0.8 m. However, these dimensions are inadequate, for example, for the new HDTV television standard in which a minimum picture diagonal of 1.5 m is required to furnish users with a picture angle customary in movie theaters.

Liquid crystal displays, plasma displays and ferromagnetic displays can also achieve only relatively small pictures, the liquid crystal display being at present limited practically to a maximum of the size of a post card.

On the other hand, there are also solutions in which the primary television picture is transmitted indirectly by a projection process so as to be enlarged on a projection plane. To achieve the primary television picture, LCD matrices or, in the case of color television, small, very light-intensive television picture tubes are used, one tube being used for each color.

Based on the required optical transmission distance between the primary television picture and the enlarged projected picture, there is a fixed relationship between the attainable picture size and the distance between the projector and the screen. The projector must only be at a slight distance from the screen due to limited light output and the cost of the optical system. Therefore, it has not been possible thus far to bridge the distance between the projector and the screen in a movie theater with available projector capacities.

In addition to the above-mentioned devices for projecting a television picture, there are also devices which use lasers as light sources for producing a color video picture (e.g. Funkschau 1970, issue 4, page 96, or EP-OS 0 084 434). To accomplish this, three differently colored lasers are modulated in intensity by means of light modulators and combined via a mirror system to form a common light bundle which is mechanically deflected via a mirror system and projected on a screen.

A somewhat different solution is indicated in DE-OS 31 52 020. In this case, the differently colored light bundles are not combined to form a common light bundle, but rather are projected independently from one another by means of a lens system toward a mirror which reflects the light beams on a screen. The mirror is ground to form small concave mirrors and, in addition to deflecting, also serve to focus the individual, differently colored light bundles together in a common picture point on the screen. The chief disadvantage of this projection system lies in the complicated mirror which is difficult to produce and necessitates painstaking adjustment of the light sources and lens system.

In all of the systems for projecting with lasers mentioned above, the deflection is effected mechanically. The attainable deflection angle of the deflecting device is quite limited for achieving a sufficiently fast deflection and producing the required number of lines with the conventional polygonal mirrors. Accordingly, it is not possible to realize a television device having a small structural depth. Moreover, due to the geometry, distortion occurs toward the edge of the picture. This is the so-called "tangent error" which is caused by an angular deflection by the polygonal mirror which is uniform with respect to time and results in an irregular scanning on the screen.

In principle, the picture distortion or image error could be reduced by deflecting over only a small deflection range and the picture could be expanded via a bundle of optical fibers. However, due to the high point density in video pictures, the manufacture of such optical fibers is fraught with problems and it is very doubtful whether such an optical system could really be produced economically enough for commercial use.

Various possibilities of compensating for a tangent error by means of a so-called linearizing $f(\Theta)$ optical system are known in printing technology (for example, see "Der Laser in der Druckindustrie" by Werner Hülsbusch, Verlag H ülsbusch, 1990, pages 252, 257, 261, 431, 443, 473, 485). However, the optical systems described in the pertinent literature cannot readily be used for video projection, since they have two considerable disadvantages:

1. The solutions derived from the printing industry only work with a monochromatic light source so that they need not take into account color distortions. However, in a video projection system for color pictures, in addition to the correction of geometrical-optical errors and the field curvature produced by the deflecting device, a correction of color distortions is also required.

2. The aforementioned optical systems are designed chiefly to compensate for geometrical image errors due to mechanical deflection; however, they cannot bring about an increase in the deflecting angle. Accordingly, these known optical systems for producing large picture fields also have quite large structural depths, which is highly undesirable and impracticable in the field of television technology.

Accordingly, these optical systems which are essentially used in printing technology can only compensate for system-conditioned errors of the deflecting device with the use of monochromatic lasers. But they have no effect on the size of the picture in relation to the given deflecting angle and thus have no influence on the required optical transmission distance.

OBJECT AND SUMMARY OF THE INVENTION

Proceeding from the prior art described above, the present invention has as a primary object providing a projection system for video pictures which can achieve a substantially larger picture and, at the same time, has a particularly small structural depth. Further, a transformation optical system suitable for use in such a projection system is also provided.

This object is met, according to the invention, in a projection system of the generic type by arranging between the deflecting device and the screen a transformation optical system which has at least two stages and is corrected in accordance with the tangent condition so as to be free of distortion.

In the projection system according to the invention, the deflecting angle can be substantially increased by using the transformation optical system which has at least two stages. At the same time, the structural depth remains relatively small and other, different imaging errors can also be compensated for by means of the different optical stages. For example, the deflecting angle can be increased by means of one stage of the transformation optical system, while color distortions which may occur can also be compensated for in an advantageous manner, in addition to the imaging errors, by means of the second stage.

Accordingly, a particularly large deflection (and accordingly a large picture size) of the video picture can be achieved by means of the invention so that the required structural depth is decidedly reduced. It has been shown that color distortions of the transformation optical system can also be sufficiently compensated for with only two optical stages so that the invention can also be used for projecting color television pictures. Thus, in a practical embodiment example, a projection system, according to the invention, for color video pictures can be realized with a structural depth of only 60 cm and a screen diagonal of 2 m.

According to a preferred further development of the projection system according to the invention, a field lens is arranged in the common beam path between the transformation optical system and the screen so that all light bundles, including those occurring at the edge of the screen, are parallelized in the direction of the viewer and a picture of particularly uniform brightness is formed on the screen for the viewer.

According to another advantageous construction of the invention, the field lens is a Fresnel lens. Fresnel lenses can have a very flat construction and are easily realized, e.g. by means of plastic foils, so that the projection system according to the invention can have a particularly flat construction and the weight of the total system is further reduced compared to the use of other field lenses, and the Fresnel lens increases the cost only slightly.

In another preferred further development of the invention, the Fresnel lens is arranged in such a way that the picture produced by the transformation optical system is at a distance from the deflecting device in the focal point of the Fresnel lens or at a distance corresponding to ±20% of the focal length of the Fresnel lens from its focal point. This advantageously ensures that the light bundles exiting from the transformation optical system in different directions strike the screen vertically so that a particularly uniform illumination of the screen is achieved in a simple manner.

Fresnel lenses are available in different constructions, depending on the optical quality required, and Fresnel lenses whose zone structure is located on only one surface, while the opposite surface is flat, are adequate for many purposes. According to a preferred further development of the invention, a Fresnel lens of this type is arranged in such a way that its flat surface faces the transformation optical system. Above all, this is advantageous for the flat construction of the projection system, since the Fresnel lens can then be arranged particularly close to the screen or can even contact it.

Given the presence in the system of an object-side principal plane associated with the transformation optical system, another preferred design of the invention consists in that the deflecting device is arranged between the principal plane on the object side and a first object-side lens vertex of the transformation optical system. As a result of this step, particularly large deflecting angles can be achieved without the risk of large image errors. Another advantage consists in that an exiting light bundle produced in such an arrangement is focussed even better than the light bundle, e.g. a laser beam, entering the transformation optical system.

The invention is further directed to a special transformation optical system which can be used particularly in the projection system according to the invention. This transformation optical system includes at least two optical stages. The first optical stage produces an intermediate image plane which is imaged on a screen by the subsequent optical stages. The subsequent optical stages can also have other intermediate image planes for imaging. But in the simplest instance, this is limited to two optical stages, particularly as it has been shown that just two stages are sufficient to compensate for geometrical optical errors and color distortions.

A very considerable increase in the deflecting angle of the deflecting device can be achieved by means of the transformation optical system according to the invention. In addition, the light bundles exiting from such a transformation optical system are also more sharply focussed than the light bundles entering the transformation optical system.

The transformation optical system according to the invention can be constructed in such a way that the optical stages, of which there are at least two, have a positive power, but also in such a way that it contains at least one optical stage with negative power. However, in the latter case, it must be ensured that the intermediate image plane can also be virtual.

According to an advantageous further development of the invention, the intermediate image plane contains an image-side focal point of the first optical stage in the case of parallel incidence of light. This means that the intermediate image plane should be located in the focal plane of the first optical stage if possible. Accordingly, in the case of parallel incident light bundles, a sharp point is always imaged on the intermediate image plane regardless of the point at which the light bundle intersects the optical axis of the first stage on the object side. As a result, the imaging effected by the subsequent optical stages from the intermediate image plane to the screen will likewise be sharp. At the same time, the sharp imaging is ensured on the intermediate image plane and consequently also on the screen even when a light bundle on the entrance or input side for producing a video picture is deflected not at only one point on the optical axis, but at a plurality of points. This happens, for example, when the deflection is effected mechanically by mirrors which are spatially separated for deflection in the line direction and picture direction of a video picture, for which reason the transformation optical system according to the invention is also particularly suitable for such deflecting systems. This is particularly true when a virtually parallel light bundle is generated on the object side, as is the case, e.g., in a laser video system.

In another advantageous further development of the invention, the second optical stage has a focal length of less than half the focal length of the first optical stage, which allows a sharp reduction in the structural depth of the total optical projection system compared with the size of the picture on the screen.

In a particularly preferred manner, the focal length of the second stage is even less than ⅓ of the focal length of the first stage.

In order to simplify optical calculations, optical systems and optical stages generally have principal planes and focal points on the object side as well as on the image side. According to a preferred further development of the invention, the object-side principal plane of the transformation optical system is located outside a first lens vertex and the object-side focal point of the first optical stage is located between the principal plane on the object side and the first lens vertex. Accordingly, the focal point is freely accessible so that the deflecting device of a projection system, for example, can be arranged there. The arrangement of a deflecting device in the vicinity of the focal point is particularly advantageous for the focussing on the intermediate image plane and accordingly also for the quality of the imaging on the screen due to the subsequent stages. Geometric-optical image errors and color distortions can be compensated for in a particularly advantageous manner by arranging the object-side focal point between the object-side principal plane of the first optical stage and the first lens vertex.

According to another preferable further development of the invention, the first optical stage and the second optical stages are multiple-lens arrangements so that different imaging errors can be compensated for particularly well. In addition, multiple-lens arrangements also provide a greater degree of freedom for selecting the position of the principal planes.

Another advantageous further development of the transformation optical system, according to the invention, which has one or more different intermediate image planes between the individual optical stages consists in that each intermediate image plane is situated between a final lens vertex of an optical stage and a first lens vertex of the subsequent optical stage, so that every intermediate image plane is located outside the lens material. Accordingly, faults, e.g. inhomogeneity, in the lens material have only a very slight effect on the sharpness of the projected image.

In the following, the invention is explained in more detail in principle with reference to the drawings.

DESCRIPTION OF THE PREFERRED EMBODIMENTS

The embodiment examples shown in the drawings show systems for color picture projection, but the invention can also be used for monochromatic image projections.

Figure 1:
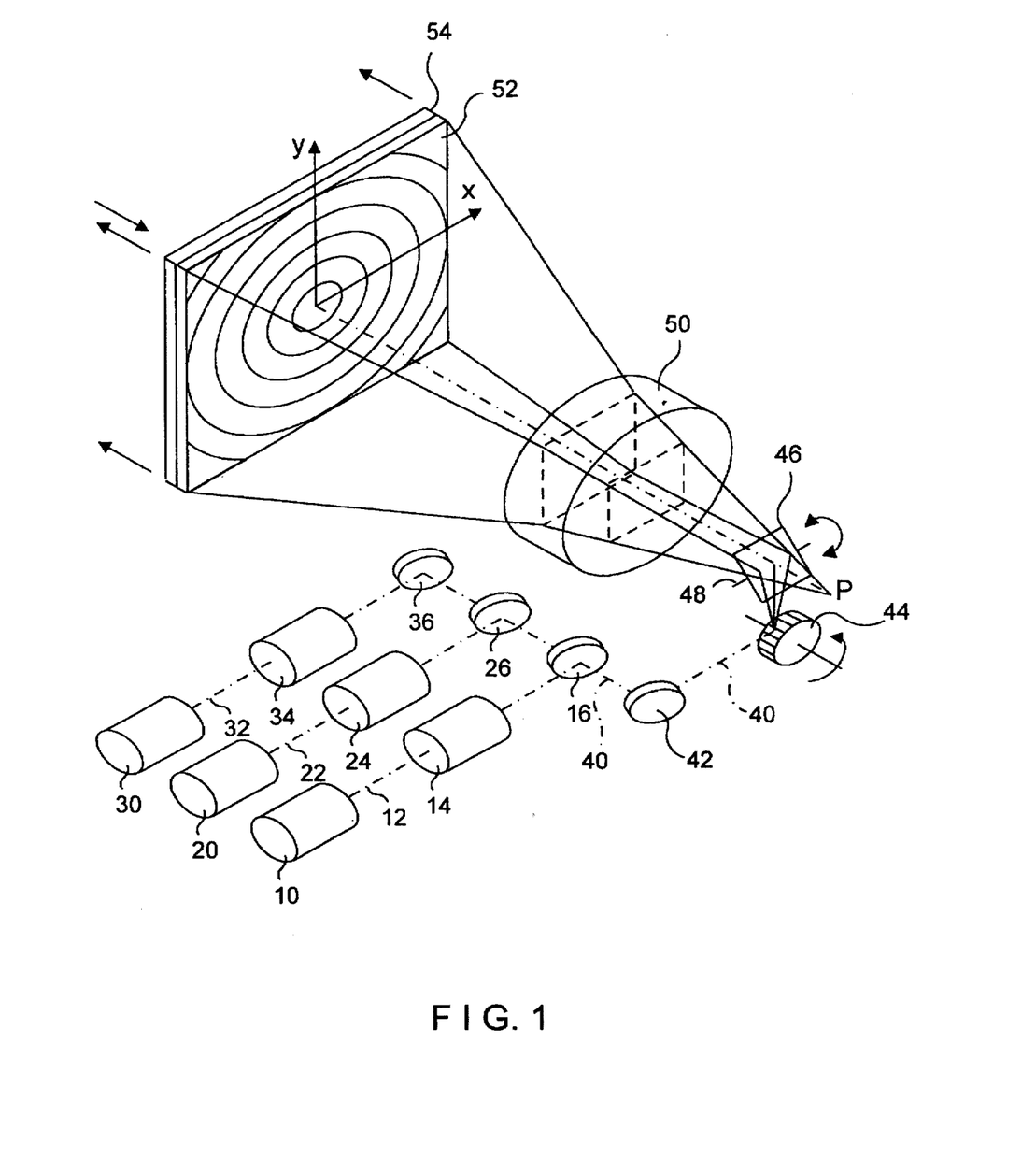
FIG. 1 is a schematic view of an embodiment example for a projection system according to the invention.

In a projection system for a color television picture, which is shown schematically in FIG. 1, the color of each picture point is formed by three different primary colors which can be produced by corresponding color signals depending on the desired hue and brightness.

In the projection system shown in FIG. 1, three light sources 10, 20, 30 generating substantially parallel light bundles 12, 22, 32 are used for controlling the hue and brightness. Lasers are particularly suitable for this purpose. However, it is also possible to use other light sources, e.g. LEDs, in which the light bundles are parallelized by means of an optical system. By way of example, the optical system can be one in which the LED in question is arranged in its focal point. Diaphragms may also be provided for restricting the beams. The voltage to the LEDs is changed for the purpose of controlling the intensity of the light sources. LEDs which are as punctiform as possible are particularly advantageous.

In the example of FIG. 1, rare-gas lasers are provided for the light sources 10, 20, 30. Since their intensity cannot be switched quickly enough for a video picture, the light sources 10, 20, 30 are operated with a constant light output and the light intensity is changed by means of additional modulators 14, 24, 34, for which DKDP crystals are particularly suitable as is known from the prior art.

The individual light bundles 12, 22, 32 are combined by means of dichroic mirrors 16, 26, 36 to form a common light bundle 40 which unifies all light bundles with the color projection system and passes through the projection system in an individual beam path.

A deflecting device is used to produce the image. The individual picture points of the video television picture can be formed in sequence by means of this deflecting device. The common light bundle 40 could now be deflected directly onto a screen 54 solely by means of the deflecting device. In the context of the present invention, screen 54 is substantially planar. But to achieve a particularly compact overall television projection system and to make advantageous use of the available space, it is also possible to arrange different units of the projection system at locations which cannot be optically connected by straight lines, in which case the common beam bundle 40 must be bent or deflected. Such a deflection is carried out in FIG. 1, for example, by means of a mirror 42 which directs the light bundle 40 to the deflecting device.

The deflecting device in the embodiment example of FIG. 1 includes a polygonal mirror 44 and a swiveling mirror 46. The polygonal mirror 44 is rotated continuously and the light bundle is deflected line by line by the series of polygonal surfaces. This deflecting direction of the polygonal mirror 44 will be referred to in the following as the X direction. The swiveling mirror 46 is swiveled back and forth around an axis 48 for picture scanning. Its deflecting direction is referred to hereinafter as the Y direction. Electronic equipment known from the prior art is provided for the swiveling and synchronization.

After deflection in the X and Y directions, the common light bundle 40 is guided through a transformation optical system 50 whose operation will be described presently. For an understanding of the embodiment example in FIG. 1, the important fact is that the transformation optical system 50 increases the deflecting angles and accordingly enlarges the projected television picture. In so doing, the transformation optical system, in which the location of the deflecting device is known as an entrance pupil in the conventional nomenclature of optics, images in an exit pupil associated with the entrance pupil by way of the transformation optical system.

After exiting the transformation optical system 50, the common light bundle 40 is cast on a Fresnel lens 52 and then onto a screen 54, on which it is made visible to a viewer in the direction of the arrows as a picture point of the video picture.

In principle, the television picture could be cast directly onto a screen 54 which, if it were constructed as a ground-glass screen, would scatter light in all possible directions. However, even in a ground-glass screen, the light intensity in the direction of the viewer depends to a great extent on the angle of the incident light bundle so that the intensity would be lower at the edges of the picture than in the center in particularly large television pictures. The different intensity could also be made uniform by changing the light intensity at the light sources 10, 20, 30, but there is another method which is considerably more advantageous: a field lens, which is realized in this case by means of the Fresnel lens 52, parallelizes the light emerging at different angles from the transformation optical system 50 in the direction of the viewer. Based on the laws governing lens optics, the light is best parallelized in the direction of the arrows when the focal point of the Fresnel lens 52 lies in the exit pupil of the transformation optical system 50.

An embodiment example according to FIG. 1 has shown that good deflecting characteristics still exist when the exit pupil of the transformation optical system is at a distance of ±20% of the focal length of the Fresnel lens 52 from its focal point.

A Fresnel lens normally has a zone structure on one surface which simulates the imaging characteristics of a thicker lens by zones. A zone structure can also be arranged on the opposite surface in order to improve the quality of a Fresnel lens. But a Fresnel lens 52 having a zone structure on only one surface, while the opposite surface is flat, has been shown to be fully sufficient for the embodiment example according to FIG. 1. The zone structure of the Fresnel lens 52 faces the screen 54 and the flat surface faces in the direction of the transformation optical system 50, resulting in a particularly flatter construction.

In the embodiment example according to FIG. 1, the deflection is effected electromechanically by the polygonal mirror 44 and the swiveling mirror 46, although this leads, at first, to two negative characteristics:

First, the deflection of the light bundle 40 in the X direction by means of the polygonal mirror 44 takes place at a different point than the picturewise deflection in the Y direction via the swiveling mirror 46. That is, the center of rotation for the deflection in the X direction is situated on the polygonal mirror 44. With regard to the deflection of the swiveling mirror 46, the virtual point for the imaging effected by the transformation optical system 50 with the subsequent Fresnel lens 52 lies in point P shown in FIG. 1. The deflection in the Y direction, on the other hand, is effected by swiveling the swiveling mirror 46 around the axis 48 so that there is not only one individual point in the system for the deflection for the television picture. In general, this is not critical if the distance from point P to the axis 48 is very small compared to the distance of point P from the screen 54, i.e. when the projection is effected without the transformation optical system. However, deflection in different points must be taken into account when designing a transformation optical system, since then there are different entrance pupils for the X and Y deflections. The transformation optical system 50 must therefore be designed in such a way that the imaging is negligible with respect to the position of the entrance pupil.

The second characteristic to be taken into account in such a television projection system is the nonlinearity in the imaging of a rotated mirror. In the case of a rotated or moving mirror rotating at constant angular velocity, the deflection X on the screen 54 is not constant, since the relation between X with a deflecting angle e and the optical axis of the system is given by the following equation $$X = L \cdot \tan\Theta,$$

where L represents the distance from deflecting point P to the screen 54.

In the following, the operation of the transformation optical system 50 will be passed over for the time being.

For small angles $\Theta$, the tan $\Theta$ extends approximately linearly. However, the change in deflection x is $$|\Delta x| = L \cdot \Delta\Theta / \cos^2\Theta.$$

It follows that when $\Theta = 0°$ the change $\Delta x$ is only half as great as when $\Theta = 45°$.

This simple numerical example illustrates the magnitude of the anticipated effect. This may be remedied by selecting a very large distance L between the deflecting region and the screen 54 with a constant picture size so that the deflecting angles $\Theta$ are very small, i.e. remain in the approximately linear region. However, limits are set for practical applications so that a projection system according to the invention remains within acceptable spatial limits and can be used, for example, in a living room.

To overcome this problem, a transformation optical system 50 is introduced which extensively compensates for the image errors described above.

In the projection system of FIG. 1, the deflection angle $\Theta$ corresponds to the angle of incidence in the entrance pupil of the transformation optical system; therefore, the angle of incidence is also designated by $\Theta$ in the following.

There are known optical systems which transform an angle of incidence $\Theta$ of a light bundle on the input side into an angle $\Theta'$ on the output side, where $\Theta'$ designates the emergent angle of the light bundle exiting from the exit pupil relative to the optical axis.

The following equation must be fulfilled in order to image an object without distortion:

$$\tan\Theta' = K \cdot \tan\Theta,$$

where K is a constant of the lens system. This equation is called the "tangent condition".

With the intermediary of a transformation optical system 50 which satisfies the tangent condition, the following equation is given for the deflection X of the beam bundle 40 between the deflecting device and the screen 54:

$$X = L \cdot \tan\Theta'.$$

The inclusion of the tangent condition gives:

$$X = L \cdot K \cdot \tan\Theta.$$

It can be seen that the deflecting range (angle $\Theta$) can be reduced for a given maximum deflection X when K>>1. The given tangent error is accordingly reduced, since the tangent of angle $\Theta$ can be approximately equated to the angle $\Theta$ when $\Theta \to 0$.

However, it will also be noted that a distortion caused by the tangent error only disappears when the value of K approaches infinity. For this reason, a relatively large value equal to or greater than 2 should be selected for K in a transformation optical system 50 which satisfies the tangent condition. But a substantially greater factor K is more advantageous. In the embodiment example according to FIG. 1, a value for K of approximately 5 is used for the transformation optical system 50.

In order to minimize image errors, the transformation optical system 50 is corrected so as to be free of distortion according to the tangent condition given above. As a rule, such an optical system is designed with the help of computer programs in a manner familiar to the person skilled in the art.

Figure 2:
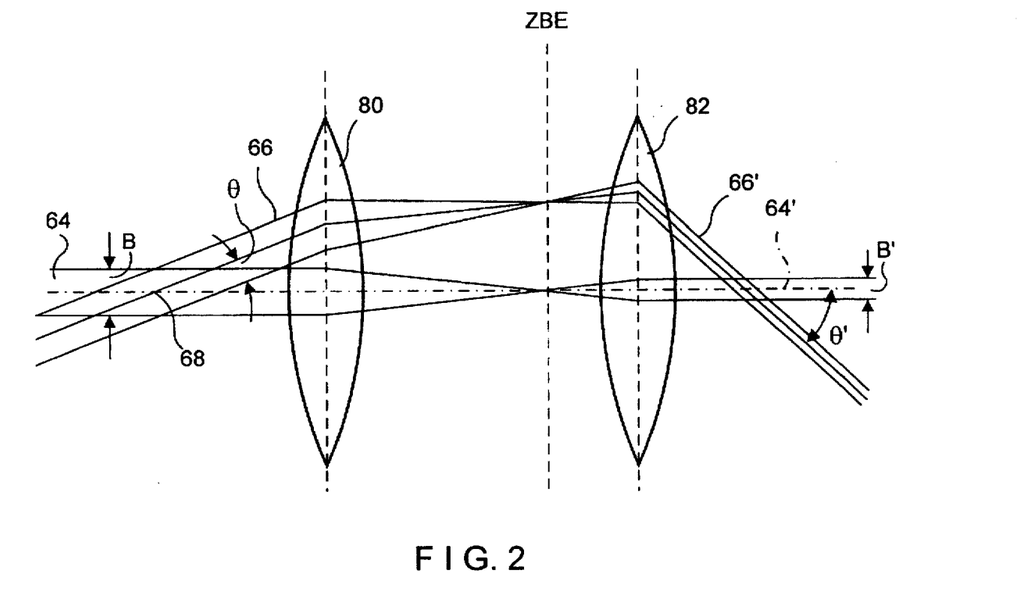
FIG. 2 is a schematic view of a two-stage transformation optical system.

FIG. 2 shows a lens system which is formed by two biconvex lenses 80 and 82 and illustrates the imaging principle for realizing a transformation optical system 50 which is corrected according to the tangent condition so as to be free of distortion. The entrance pupil 68 is situated in the focal point on the object side to illustrate this principle. The two biconvex lenses 80 and 82 are arranged at a distance from one another at which the focal point of the biconvex lens 82 on the object side coincides with the focal point of the biconvex lens 80 on the image side. A light bundle 64 traveling along the optical axis is focussed in the image-side focal point of the lens 80 and reemerges from the latter as a parallel beam 64', since this image-side focal point of the lens 80 coincides with the image-side focal point of the other biconvex lens 82. If the focal length of the second biconvex lens 82 is less than that of the biconvex lens 80, the beam width B' of the emergent light bundle 64' is narrower or smaller than the beam width B of the incident light bundle 64, specifically by a factor of $F_2/F_1$, where $F_1$ represents the focal length of the first biconvex lens 80 and $F_2$ represents the focal length of the second biconvex lens 82.

Similar conditions apply for a beam bundle 66 which enters at an angle $\Theta$ and is also focussed in the focal plane and reemerges from the second biconvex lens 82 likewise as a parallel beam bundle 66'. FIG. 2 clearly shows that the constant for the tangent condition in this example is also given by the ratio of the focal lengths:

$K=F_1/F_2$.

In the lens system shown in the drawing, a light bundle which enters the entrance pupil 68 is focussed on an intermediate image plane ZBE, and the angle $\Theta$ of the light bundle, considered mathematically, is transformed due to the first biconvex lens 80 into a distance (from the optical axis) on the intermediate image plane ZBE. The distance is transformed back into an angle $\Theta$ by means of the second biconvex lens 82.

FIG. 2 shows the basic physical factors in a two-stage imaging. It does not provide any information concerning monochromatic or polychromatic image errors. However, when the biconvex lenses 80 and 82 are replaced by two optical multiple-lens stages, image errors can be compensated for in the conventional way. In the construction of a transformation optical system according to FIG. 1 it has been shown that this imaging principle is well suited to compensate for monochromatic and polychromatic imaging errors.

Figure 3:
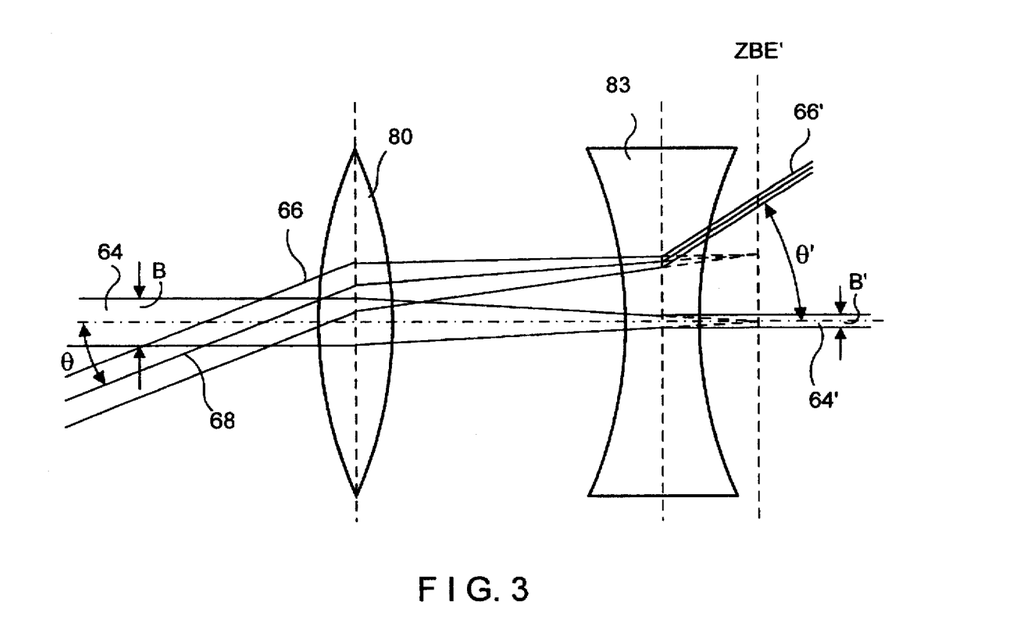
FIG. 3 is a schematic view of a two-stage transformation optical system with virtual intermediate image plane.

FIG. 3 shows another embodiment example showing behavior similar to that of the system in FIG. 2. In contrast to FIG. 2, the biconvex lens 82 is replaced here by a biconcave lens 83 whose focal point on the image side coincides with the image-side focal point of the biconvex lens 80. Thus, conditions similar to those in FIG. 2 are given, but the intermediate image plane ZBE lies outside the two lenses 80, 83 and there is only a virtual image on the intermediate image plane. As can be seen from the beam path 66, 66', the emergent angle of a light bundle is also increased over the incident angle with reference to the optical axis. When the lenses 80, 83 are replaced by optical stages in this simplified example, monochromatic or polychromatic imaging errors can be compensated for within the individual stages or integrally over the entire optical system.

Figure 4:
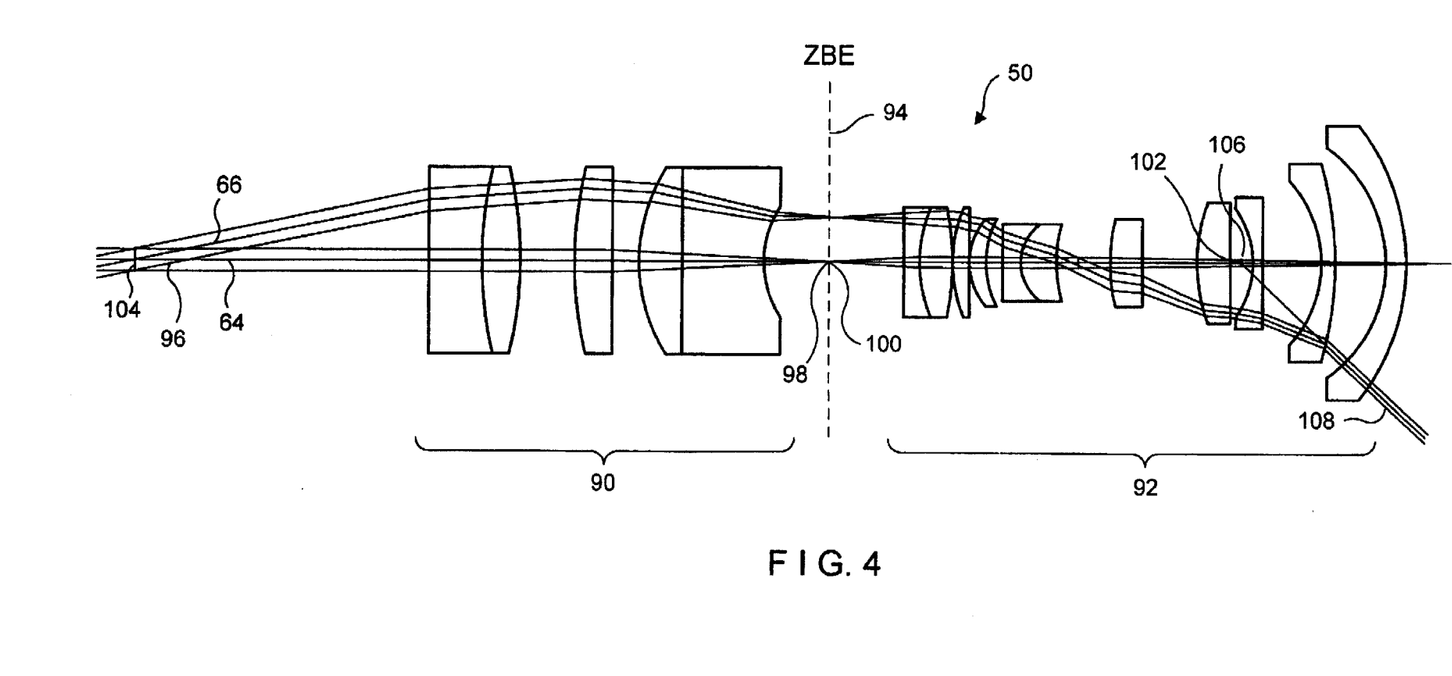
FIG. 4 shows an embodiment example for a transformation optical system according to the invention (shown with reference to the path of two beam bundles)

FIG. 4 shows a lens system with an entrance pupil 104 and an exit pupil 106. This lens system works on the principles discussed in connection with FIG. 2. It includes two optical stages 90 and 92 with an intermediate image plane 94. The first optical stage 90 has a focal point 96 on the object side and a focal point 98 on the image side and the second optical stage 92 has a focal point 100 on the object side and a focal point 102 on the image side (FIG. 4). In the embodiment example shown in the drawing, the first optical stage 90 has a focal length of 42.88 mm and the second optical stage 92 has a focal length of 8.42 mm.

The entrance pupil 104 lies at a distance of 5 mm from the object-side focal point 96 of the first optical stage 90. Accordingly, the conditions in the example of FIG. 2 are substantially simulated. The intermediate image plane 94 lies in the image-side focal point 98 of the first optical stage 90: its distance from the object-side focal point 100 of the second optical stage 92 is only 0.08 mm. The exit pupil 106 is also situated in the vicinity of the image-side focal point 102 of the second optical stage 92.

FIG. 4 also shows the path of two beam bundles 64 and 66 through the two-stage system. As was already shown in FIG. 2, the beam bundles 64, 66 are focussed on an intermediate image plane 94 by means of a first optical stage 90, a corresponding picture point for the beam bundle being generated on the intermediate image plane 94 as a function of the incident angle of the beam bundle 66. This picture point which is focussed on the intermediate image plane 94 is subsequently transformed by the second optical stage 92 on the projection plane, wherein the emergent angle is greater than the incident angle.

In this example, the intermediate image plane ZBE 94 lies between the lens vertices of the first optical stage 90 and the second optical stage 92. If the two optical stages 90 and 92 were constructed in such a way that the image-side focal length of the first optical stage 90 were situated within the body (material) of a lens of one of the two stages, it is possible that inhomogeneity in the lens material or dust on the surface of the lens would not allow a sharp imaging on the intermediate image plane ZBE. However, since the intermediate image plane ZBE is arranged in the space between the two optical stages 90 and 92, such defective imaging which would also be transferred to the projection on the screen 54 via the second stage 92 (FIG. 1) is prevented.

As was already discussed in the example in FIG. 2, FIG. 4 also shows that the emergent, approximately parallel beam bundle 108 has a considerably smaller beam width than the incident beam 66, i.e. it is narrower than the latter. Since the focal length of the first stage is 42.88 mm and that of the second stage is 8.42 mm and the value of the constant K in the tangent condition is thus greater than 5, the distance from the screen can be reduced by a factor of approximately 5 with this transformation optical system for identical angles $\Theta$, and by a factor of 5 with a simultaneous improvement of the beam width of the light bundle striking the screen over the light bundle entering the transformation.

Figure 5:
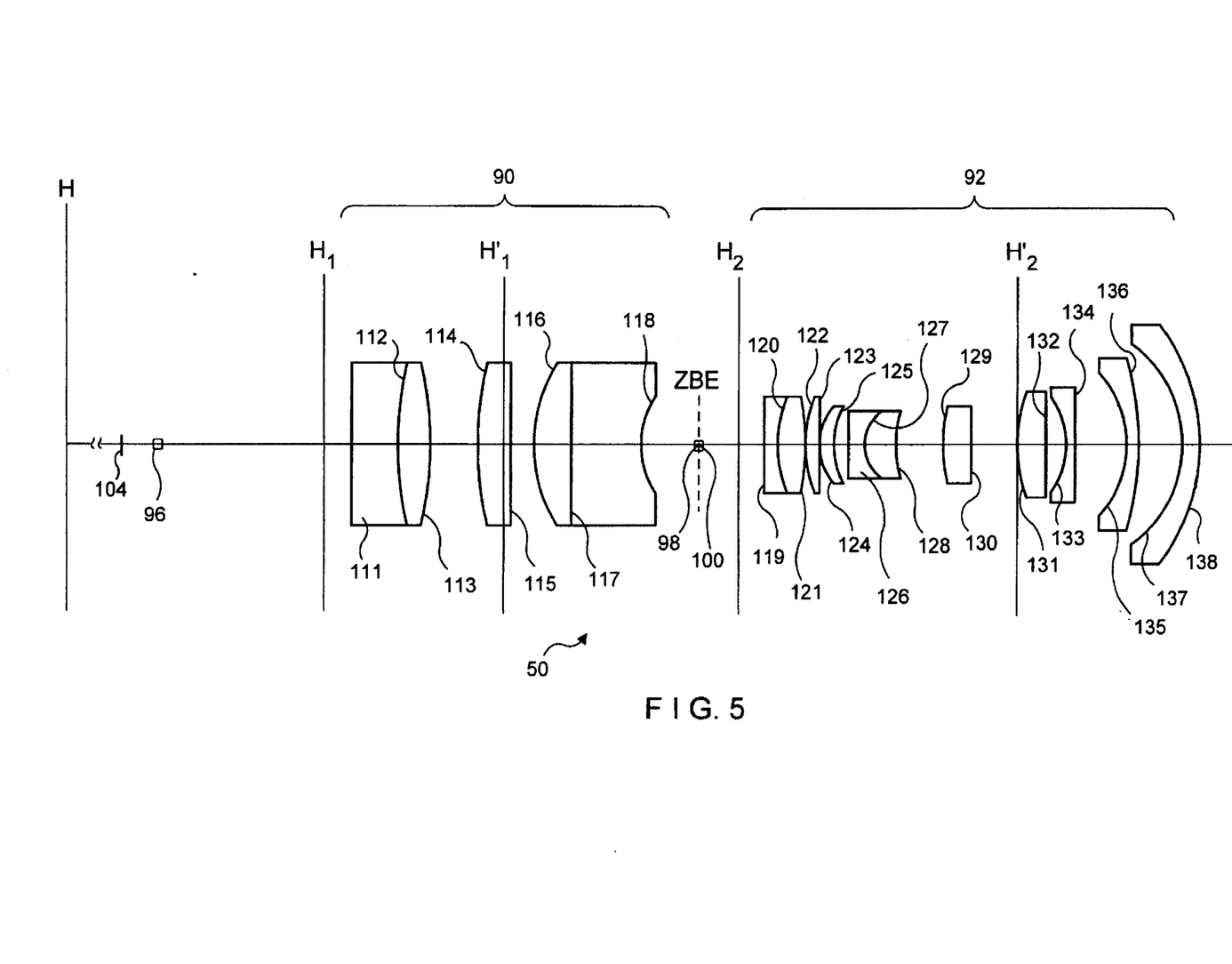
FIG. 5 shows the transformation optical system, according to the invention, from FIG. 4 for a more detailed explanation of the construction of a lens system.

The lens system in FIG. 4 is shown again in greater detail in FIG. 5, which also indicates the object-side principal plane $H_1$ and the image-side principal plane $H_1'$ of the first optical stage 90 and the object-side principal plane $H_2$ and image-side principal plane $H_2'$ of the second optical stage 92. H represents the object-side principal plane of the entire transformation optical system 50.

However, the position of the principal plane H is not shown in scale. Rather, in the practical design of a transformation optical system according to FIG. 6, the principal plane H is arranged at a distance of several meters from the principal plane $H_1$ of the first optical stage.

The entrance pupil 104 is situated not very far from the object-side focal point 96 of the first stage 90, i.e. it is located between the latter and the principal plane H of the entire transformation optical system 50, so that the conditions are similar to those in FIG. 2. The distance between the image-side focal point 98 of the first optical stage 90 and the object-side focal point 100 of the second optical stage 92 is short, under 1 mm, to realize the principle shown in FIG. 2.

FIG. 5 shows the individual lens surfaces with reference numbers 111 to 138. The physical dimensions of the transformation optical system 50 from FIG. 5 are indicated in the accompanying table. In the table, D represents the distance between the two surfaces (measured on the optical axis), N is the index of refraction, and v designates the Abbe coefficient derived from a mean refractive index and the base dispersion. Where the table shows an index of refraction of 1 without indicating v, this represents an intermediate space between the lenses.

Figure 6:
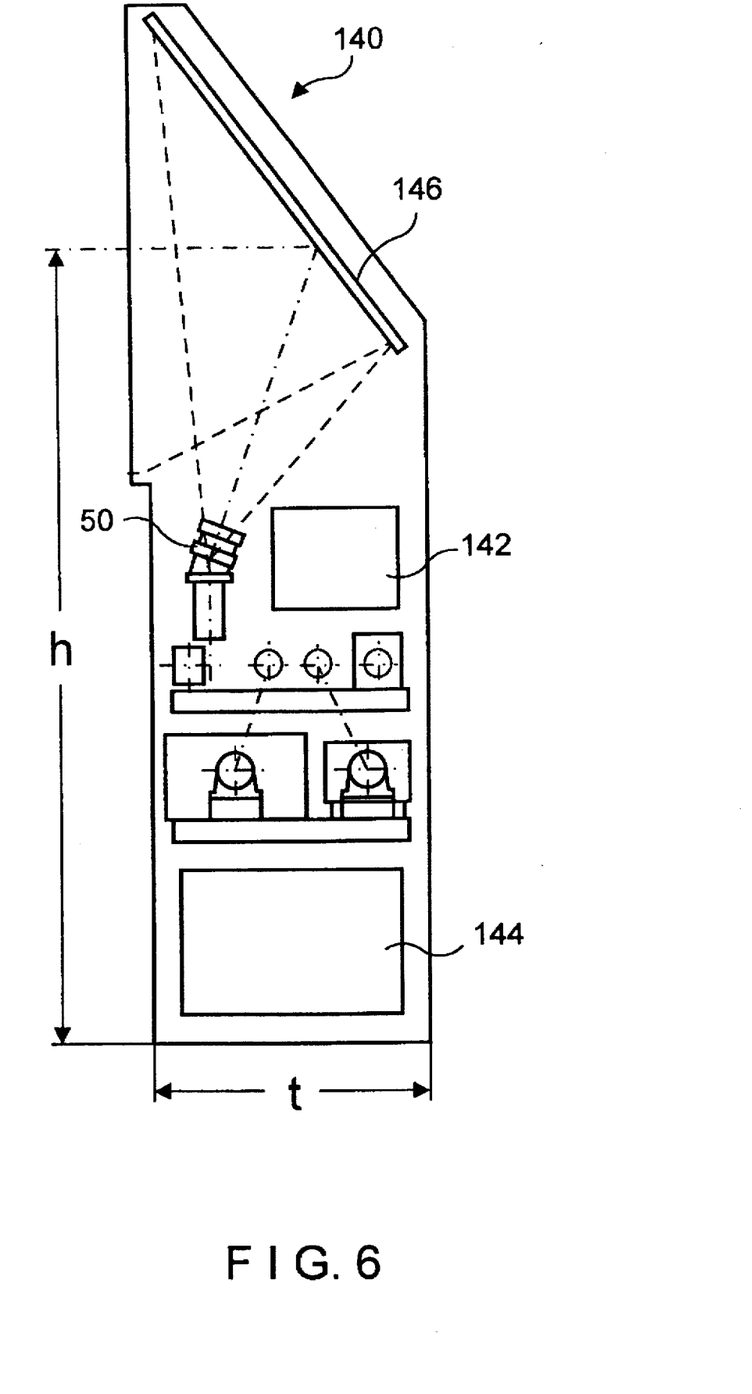
FIG. 6 shows a construction embodiment form for a projection system according to the invention.

FIG. 6 shows a projection system 140 which is constructed according to the principle of the embodiment example of FIG. 1 with the described transformation optical system 50. In addition to the components which were already described, the projection system 140 is also provided with devices 142 and 144 which contain the electronics, not shown in detail, required for producing a video picture. The projection system 140 has a picture diagonal of 200 cm. The height h of the device up to the center of the screen is 1.5 mm and the depth of the device is only 60 cm. This small depth in relation to the screen size is a result of the transformation optical system 50 and a mirror 146 which likewise increases the beam distance from the screen to the deflecting unit. The transformation optical system 50 reduces the length between the deflecting unit and the screen (as described above) by a factor of 5. This means that light paths of more than 5 m would have to be provided in the example of FIG. 6 without the use of the transformation optical system 50 according to the invention in order to obtain a picture of similar size.

In addition to the dimensions indicated above, it should also be noted that the projection system 140, apart from enabling an agreeable reduction in length, also makes it possible to improve focussing, as was shown by way of example in FIG. 2, which provides an additional advantage which cannot be achieved with the known systems.

A plurality of such transformation optical systems 50 could also be connected one after the other to achieve a further improvement, so that two stages contribute to the tangent ratio by a factor in proportion to their focal lengths. But it is also possible to outfit an individual transformation optical system 50 with more than two stages, although the number of stages used need not be an even number.

While the foregoing description and drawings represent the preferred embodiments of the present invention, it will be obvious to those skilled in the art that various changes and modifications may be made therein without departing from the true spirit and scope of the present invention.

TABLE

Appendix

| Surface number | Radius of curvature (mm) | between the surfaces | D (mm) | N | v |
|---|---|---|---|---|---|
| 111 | −665 | 111–112 | 10 | 1.6522 | 33.6 |
| 112 | 46 | 112–113 | 8 | 1.6225 | 63.2 |
| 113 | −65 | 113–114 | 10 | 1 | |
| 114 | 66 | 114–115 | 8 | 1.6225 | 63.2 |
| 115 | −489 | 115–116 | 5 | 1 | |
| 116 | 31 | 116–117 | 8 | 1.6225 | 63.2 |
| 117 | 727 | 117–118 | 15 | 1.6241 | 36.1 |
| 118 | 18 | 118–119 | 26 | 1 | |
| 119 | 164 | 119–120 | 3 | 1.7343 | 28.5 |
| 120 | 20 | 120–121 | 6 | 1.6254 | 56.6 |
| 121 | −37 | 121–122 | 0.1 | 1 | |
| 122 | 24 | 122–123 | 4 | 1.6225 | 63.2 |
| 123 | −156 | 123–124 | 0.1 | 1 | |
| 124 | 13 | 124–125 | 3 | 1.6225 | 63.2 |
| 125 | 33 | 125–126 | 2 | 1 | |
| 126 | −57 | 126–127 | 3 | 1.6241 | 36.1 |
| 127 | 8 | 127–128 | 6 | 1.5749 | 57.3 |
| 128 | 18 | 128–129 | 10 | 1 | |
| 129 | 19 | 129–130 | 7 | 1.5749 | 57.3 |
| 130 | −832 | 130–131 | 10 | 1 | |
| 131 | 25 | 131–132 | 5 | 1.7343 | 28.5 |
| 132 | 104 | 132–133 | 4 | 1 | |
| 133 | −17 | 133–134 | 2 | 1.6522 | 33.6 |
| 134 | −307 | 134–135 | 12 | 1 | |
| 135 | −21 | 135–136 | 2 | 1.5187 | 64.0 |
| 136 | −50 | 136–137 | 10 | 1 | |
| 137 | −24 | 137–138 | 2 | 1.5187 | 64.0 |
| 138 | −40 | | | | |

What is claimed is:

1. A transformation optical system, particularly for use in a projection system for projecting a video picture on a planar screen comprising: at least first and second optical stages, said first optical stage producing an intermediate plane which is imaged on the screen by means of subsequent optical stages, said transformation optical system being afocal and corrected according to a required tangent condition so as to be free of distortion, said transformation optical system enabling enlargement of a video picture while being structurally small in depth.

2. The transformation optical system according to claim 1, wherein the intermediate image plane contains an image-side focal point of said first optical stage in the case of parallel incidence of light.

3. The transformation optical system according to claim 1, wherein said second optical stage has a focal length which is less than half of the focal length of the first optical stage.

4. The transformation optical system according to claim 3, wherein said second optical stage has a focal length which is less than ⅕ of the focal length of the first optical stage.

5. The transformation optical system according to claim 1, having an object-side principal plane and an object-side focal point of the first optical stage, wherein said object-side principal plane of said transformation optical system is situated outside a first lens vertex and said object-side focal point of said first optical stage is situated between said object-side principal plane and said first lens vertex.

6. The transformation optical system according to claim 1, wherein said first optical stage and said second optical stage are multiple-lens arrangements.

7. The transformation optical system according to claim 1, having intermediate image planes between individual optical stages, wherein each intermediate image plane is situated between a last lens vertex of an optical stage and a first lens vertex of a subsequent optical stage.

8. In a projection system for projecting a video picture composed of picture points on a planar screen having at least one light source which emits a light bundle and can be varied in intensity and a deflecting device which deflects the light bundle to illuminate the picture points on the screen, the improvement comprising: a transformation system having at least two stages being arranged between said deflecting device and said screen, said transformation optical system being afocal and corrected according to a required tangent condition so as to be free of distortion, said transformation optical system enabling enlargement of said projected video picture while providing a projection system with reduced depth.

9. The projection system according to claim 8, including a field lens arranged between said transformation optical system and said screen.

10. The projection system according to claim 9, wherein said field lens is a Fresnel lens.

11. The projection system according to claim 10, wherein the picture produced by said transformation optical system is at a distance from the deflecting device in the focal point of the Fresnel lens.

12. The projection system according to claim 10, wherein the picture produced by said transformation optical system is at a distance corresponding to ±20% of the focal length of the Fresnel lens from its focal point.

13. The projection system according to claim 10, wherein the Fresnel lens has a flat surface facing said transformation optical system.

14. The projection system according to claim 8, wherein an object-side principal plane is associated with the transformation optical system, said deflecting device being arranged between said object-side principal plane of the transformation optical system and a first object-side lens vertex of the transformation optical system.

15. The projection system according to claim 8, wherein said two stages comprise a first and second optical stage, said first optical stage producing an intermediate image plane which is imaged on the screen by means of subsequent optical stages.

16. The projection system according claim 15, wherein the intermediate image plane contains an image-side focal point of said first optical stage in the case of parallel incidence of light.

17. The projection system according claim 15, wherein said second optical stage has a focal length which is less than half of the focal length of the first optical stage.

18. The projection system according to claim 17, wherein said second optical stage has a focal length which is less than ⅕ of the focal length of the first optical stage.

19. The projection system according to claim 15, wherein said object-side principal plane of said transformation optical system is situated outside a first lens vertex and said object-side focal point of said first optical stage is situated between said object-side principal plane and said first lens vertex.

20. The projection system according claim 15, wherein said first optical stage and said second optical stage are multiple-lens arrangements.

21. The projection system according claim 15, wherein each intermediate image plane is situated between a first lens vertex of an optical stage and a first lens vertex of a subsequent optical stage.

* * * * *

UNITED STATES PATENT AND TRADEMARK OFFICE
CERTIFICATE OF CORRECTION

PATENT NO. : 5,694,180
DATED : December 2, 1997
INVENTOR(S) : Christhard Deter et al.

It is certified that error appears in the above-identified patent and that said Letters Patent is hereby corrected as shown below:

Title page,
Item [73], Assignee, should read as follows:
-- [73]   LDT GmbH & Co. Laser-Display-Technologie KG Gera, Germany and
           Carl Zeiss June GmbH Jena, Germany --

Signed and Sealed this

Twenty-second Day of June, 2004

JON W. DUDAS
*Acting Director of the United States Patent and Trademark Office*